United States Patent [19]
Egan et al.

[11] Patent Number: 4,538,331
[45] Date of Patent: Sep. 3, 1985

[54] METHOD OF MANUFACTURING AN INTEGRAL BLADED TURBINE DISK

[75] Inventors: Michael J. Egan, Milford; Gary J. Quill, Birmingham, both of Mich.

[73] Assignee: Williams International Corporation, Walled Lake, Mich.

[21] Appl. No.: 466,168

[22] Filed: Feb. 14, 1983

[51] Int. Cl.³ .................. B21K 3/04; B23P 15/02; B23P 15/04
[52] U.S. Cl. .................. 29/156.8 R; 29/DIG. 5; 29/23.5; 164/75; 164/76.1; 164/101; 164/108; 219/121 EG; 228/194; 228/231; 416/213 R; 416/244 A; 416/248
[58] Field of Search .............. 29/156.8 R, 23.5, 527.6, 29/DIG. 4, DIG. 5; 164/100, 101, 102, 108, 75, 76.1; 228/194, 231; 416/213 A, 244 A, 248, 244 R, 213 R; 219/121 EG, 121 ED

[56] References Cited

U.S. PATENT DOCUMENTS

| | | | |
|---|---|---|---|
| B 479,502 | 3/1976 | Nakazaki et al. | 219/121 EM |
| 2,380,276 | 7/1945 | Warren | 29/156.8 R |
| 2,894,318 | 7/1959 | Bloomberg | 29/156.8 |
| 2,957,214 | 10/1960 | Kuharski | 164/100 X |
| 3,000,081 | 9/1961 | Webb | 29/156.8 R |
| 3,609,841 | 10/1971 | Telfer et al. | 219/121 ED X |
| 3,610,873 | 10/1971 | Yansteenkiste | 219/121 ED |
| 3,617,685 | 11/1971 | Brill-Edwards | 219/121 ED |
| 3,632,319 | 1/1972 | Hoppin | 228/194 |
| 3,765,793 | 10/1973 | Savonuzzi | 416/213 X |
| 3,802,046 | 4/1974 | Wachtell et al. | 416/213 X |
| 3,940,268 | 2/1976 | Catlin | 29/156.8 R X |
| 4,008,052 | 2/1977 | Vishnevsky et al. | 164/100 X |
| 4,063,939 | 12/1977 | Weaver et al. | 29/156.8 R X |
| 4,143,259 | 3/1979 | Hurd et al. | 219/121 ED |

FOREIGN PATENT DOCUMENTS

| | | | |
|---|---|---|---|
| 2607684 | 10/1976 | Fed. Rep. of Germany | 164/100 |
| 0045287 | 4/1981 | Japan | 219/121 ED |

*Primary Examiner*—Charlie T. Moon
*Assistant Examiner*—Ronald S. Wallace
*Attorney, Agent, or Firm*—Lyman R. Lyon

[57] ABSTRACT

The disclosure relates to a turbine rotor and method of manufacture thereof. A plurality of blades having dovetails at the radially inner ends thereof are arranged in a circumferentially spaced circular array. A metallic hub is cast about the dovetails of said blades which are metallurgically bonded by the operation. Alternatively, the blades may be joined to the hub thereafter by an electron beam weld that extends axially to the rotor.

1 Claim, 7 Drawing Figures

U.S. Patent  Sep. 3, 1985  4,538,331
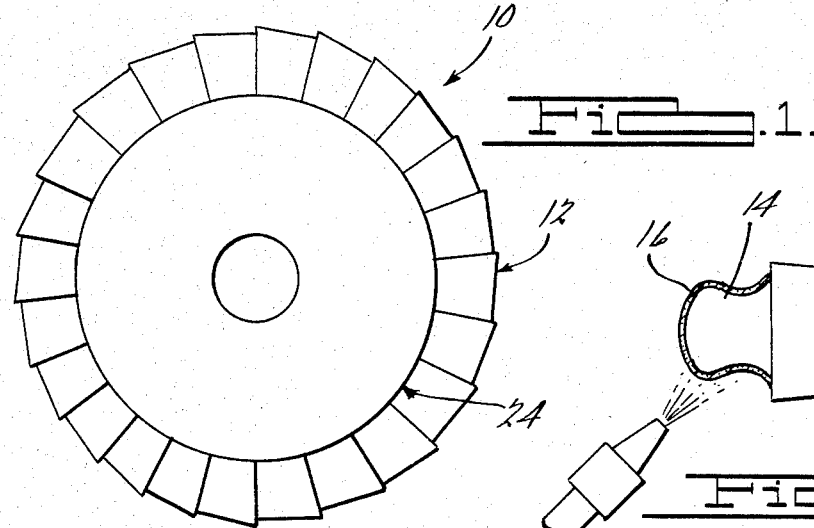
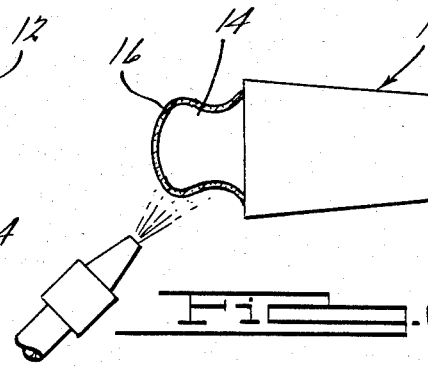
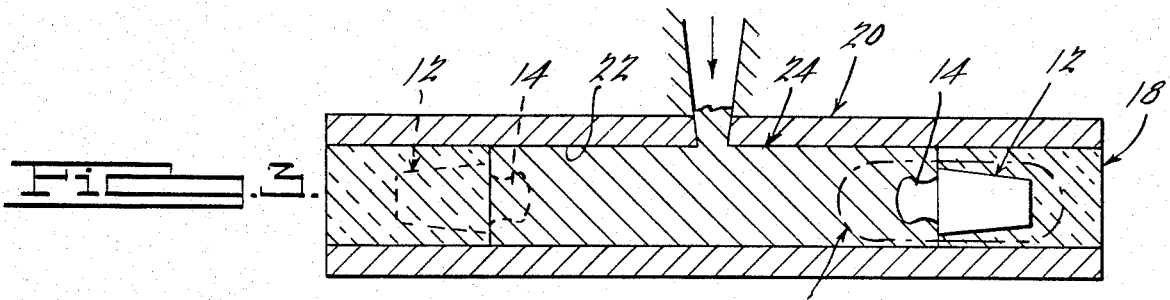
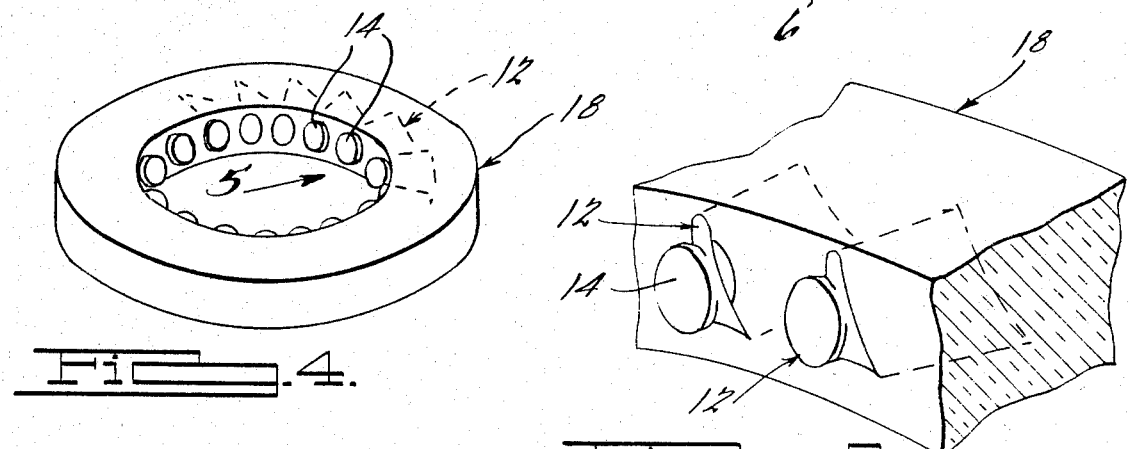
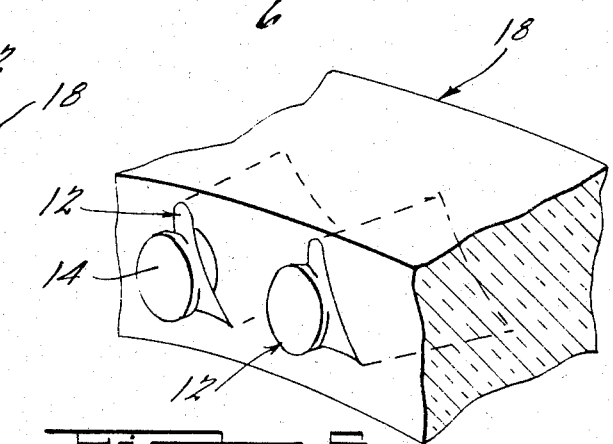
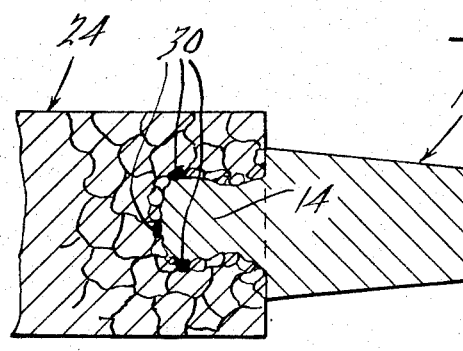
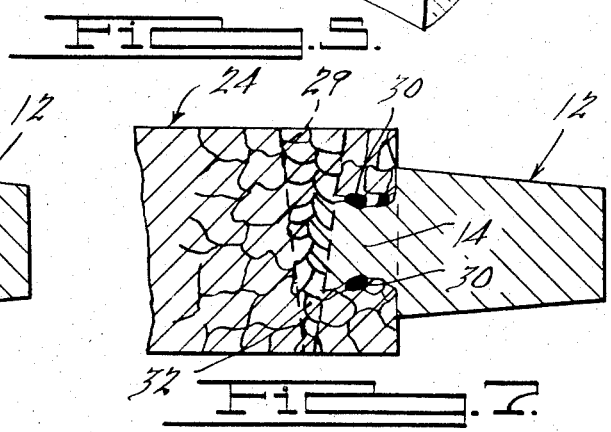

METHOD OF MANUFACTURING AN INTEGRAL BLADED TURBINE DISK

BACKGROUND OF THE INVENTION

The power and fuel efficiency of a gas turbine engine is a function of the temperature of the combustion gases at the inlet to the turbine. The temperature is generally maximized consistent with turbine and nozzle structural integrity. The maximum turbine rotor inlet temperature allowed by current state-of-the-art uncooled metal turbine rotors is approximately 2000° F. Increasing the turbine rotor inlet temperature beyond 2000° F. requires the use of advanced super alloy blade materials which are generally not compatible with the mechanical properties of the rotor hub.

A solution to this incompatibility problem is to adopt a dual-property approach to the fabrication of the turbine rotor. In large gas turbines, where size and complexity constraints are not acute, this is accomplished by using discrete blades of a high rupture strength material mechanically attached to a high burst strength disk. However, the physical size, cost, and complexity associated with this dual-property rotor concept has heretofore precluded its use in small, lightweight gas turbine engines.

SUMMARY OF THE INVENTION

The turbine wheel of the instant invention is a relatively simple, low cost multiple property integral turbine rotor for use in small gas turbine engines. The rotor has discrete, high rupture strength blades permanently bonded to a high burst strength alloy hub.

More specifically, individual turbine blades are fabricated, for example, from a single crystal alloy, directional solidification alloy including directional solidification eutectics, oxide dispersion strengthened alloy, rapid solidification rate alloy, mechanically alloyed materials, etc. Thereafter, the root and dovetail of each blade is coated with a conventional diffusion bonding material after which the blades are placed in an assembly fixture. The assembly fixture comprises inner and outer rings, the annulus therebetween being packed with resin sand or ceramic slurry as taught in application Ser. No. 466,166, filed 2-14-83, now U.S. Pat. No. 4,494,287, issued 1-22-85, and assigned to the assignee of this invention. After hardening, the annular core is stripped from the fixture, leaving a free standing sand or ceramic core with exposed blade dovetails. Alternatively, the uncoated blades may be assembled into the ceramic or sand core ring, and the exposed roots coated as an assembly. The core and blades are placed in a rotor hub mold and the rotor hub is cast about the blade dovetails. The assembly is diffusion bonded incident to casting of the hub and subjected to a hot isostatic press cycle to complete the bond.

BRIEF DESCRIPTION OF THE DRAWINGS

FIG. 1 is a plan view of a completed turbine wheel.
FIG. 2 is a view of a coated turbine wheel blade after casting thereof.
FIG. 3 is a view of a mold for casting the turbine blades to the turbine wheel hub.
FIG. 4 is a perspective view of a core ring with the turbine blades positioned therein.
FIG. 5 is a view taken in the direction of the arrow 5 of FIG. 4.
FIG. 6 is a view taken within the circle 6 of FIG. 3.
FIG. 7 is a view similar to FIG. 6 after welding.

DETAILED DESCRIPTION OF THE PREFERRED EMBODIMENT OF THE INVENTION

As seen in FIG. 1 of the drawings, a turbine wheel 10 comprises a plurality of blades 12 which are fabricated from a high temperature material by known fabrication processes. Examples of such materials are single crystals of CMSX 2, MarM 247, or NASAIR 100 in the form of directionally solidified eutectics, directionally solidified castings, or mechanically strengthened alloys.

As seen in FIG. 2, a dovetail root portion 14 of each blade 12 of FIG. 1 is prepared by grit blasting and thereafter coated with a plasma sprayed activated diffusion bond alloy (ADB) 16. The material selected for the ADB coating 16, generally a Ni-Cr-B or Ni-Cr-B-Si alloy, the coating thickness, and the method of coating are well known in the art. The ADB coating 16 is utilized to effect a metallurgical bond between components of the turbine wheel, as will be described.

As seen in FIG. 3, a ceramic blade ring 18, which may be fabricated in accordance with the teaching of application Ser. No. 06/466,166, filed Feb. 14, 1983, and assigned to the assignee of this application, holds the blades 12 in a desired array, and in combination with a mold 20, defines a mold cavity 22 suitable for the bicasting process which results in the cast turbine wheel 10.

A super heated melt is vacuum poured into the preheated mold 20 causing melting of the ADB alloy coating 16 on the dovetails 14 thereby to form a metallurgical bond between the blades 12 and a cast hub 24 as the entire mold slowly cools thereby to form the integral, multiple alloy turbine wheel 10.

More specifically, the structural elements that coact in the bonding process are the blades 12, the superalloy hub 14, both of which have melting points of approximately 2500° F., and the bond activator 16 on the dovetails 14 of the blades 12. The bond activator 16 has a melting point of approximately 2000° F. When the aforesaid combination is heated above 2000° F. in the mold 20 upon casting of the hub 24, the bond activator 16, for example, melts, due to the fact that Boron has a relatively low melting point. As time progresses and the assembly cools, Boron migrates into the hub 24, and blades 12 in the solid state. Because Boron imparts a relatively low melting point to the bond activator coating 16, migration thereof raises the melting point of the bond activator 16 and lowers the melting point of the hub 24 and blades 12 until an equilibrium point of 2200° F. is reached. When the entire assembly solidifies, the completed turbine wheel 10 is finish machined and conditioned for assembly with mating turbine engine components.

As seen in FIG. 6, voids 30 sometimes occur due to incomplete fusion between the melt and the blades 12 during solidification. This problem is typically solved by the use of hot isostatic pressing during the process cycle. However, in accordance with one feature of the instant invention, another solution is the use of a welding process comprising an electron beam that is passed through the base of the blade dovetail 14 to produce a weld area 29. The electron beam weld eliminates any voids 30 at the critical radially inner boundary between the blade dovetails 14 and the hub 24 and results in columnar grains 32 extending axially of the turbine wheel 10. Any voids are driven to a non-critical location radially outwardly of the dovetails 14 of the blades 12 at which point they may even result in desirable dampening of blade vibrations.

While the preferred embodiment of the invention has been disclosed, it should be appreciated that the invention is susceptible of modification without departing from the scope of the following claims.

We claim:

1. A method of making a turbine rotor comprising the steps of arranging a plurality of blades having dovetails at the radially inner ends thereof in circumferentially spaced circular array, coating the dovetails of said blades with a diffusion bonding material comprising an Ni-Cr-B alloy, casting a metallic hub about the dovetails of said blades resulting in a diffusion bond between said hub and the dovetails of said blades, and directing an electron beam of relatively narrow radial dimension in a direction parallel to the central axis of said hub and through a zone of relatively small radial dimension spaced radially inwardly from the outer perimeter of said hub and encompassing the radially innermost portion only of the diffusion bond between the dovetails of said blades and said hub thereby to modify the grain structure of the diffusion bond in said zone from a granular to a columnar configuration and move any voids in said diffusion bond zone radially outwardly to enhance vibration dampening.

* * * * *